US009580075B2

United States Patent
Kaneko et al.

(10) Patent No.: US 9,580,075 B2
(45) Date of Patent: Feb. 28, 2017

(54) FORKLIFT AND CONTROL METHOD OF FORKLIFT

(71) Applicant: Komatsu Ltd., Tokyo (JP)

(72) Inventors: Shinji Kaneko, Oyama (JP); Taishi Oiwa, Naka-gun (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/358,367

(22) PCT Filed: Dec. 27, 2013

(86) PCT No.: PCT/JP2013/085245
§ 371 (c)(1),
(2) Date: May 15, 2014

(87) PCT Pub. No.: WO2015/097900
PCT Pub. Date: Jul. 2, 2015

(65) Prior Publication Data
US 2016/0311432 A1  Oct. 27, 2016

(51) Int. Cl.
*B60W 30/18* (2012.01)
*F16H 61/47* (2010.01)
(Continued)

(52) U.S. Cl.
CPC ............ *B60W 30/18* (2013.01); *B60W 10/04* (2013.01); *B60W 10/06* (2013.01);
(Continued)

(58) Field of Classification Search
CPC ...... B60W 30/18; B60W 10/04; B60W 10/06; F16H 61/47
(Continued)

(56) References Cited

U.S. PATENT DOCUMENTS 5,337,629 A    8/1994  Kita
7,543,447 B2   6/2009  Itoga et al.
(Continued)

FOREIGN PATENT DOCUMENTS

CN    1065324 A    10/1992
CN    1993541 A     7/2007
(Continued)

OTHER PUBLICATIONS

International Search Report mailed Mar. 25, 2014, issued for PCT/JP2013/085245.

*Primary Examiner* — Tan Q Nguyen
(74) *Attorney, Agent, or Firm* — Locke Lord LLP

(57) ABSTRACT

A control device includes a target vehicle speed converter converting a first accelerator opening detected by an accelerator opening sensor into a target vehicle speed, an accelerator opening target value setting unit calculating a second accelerator opening by feedback control so that a deviation between the target vehicle speed and an actual vehicle speed becomes zero, an addition unit adding the first and second accelerator openings to obtain a third accelerator opening, a first maximum absorption torque calculator calculating a first maximum absorption torque of a traveling hydraulic pump based on the third accelerator opening, a second maximum absorption torque calculator calculating a second maximum absorption torque of the traveling hydraulic pump based on a rotational speed of the engine, and an HST pump electromagnetic proportional control output current converter converting a smaller one of the first and second maximum absorption torques into a target absorption torque.

8 Claims, 6 Drawing Sheets

(51) Int. Cl.
  *B66F 9/075*  (2006.01)
  *B60W 10/06*  (2006.01)
  *B60W 10/04*  (2006.01)
  *F16H 61/431*  (2010.01)

(52) U.S. Cl.
  CPC ....... *B66F 9/07572* (2013.01); *F16H 61/431* (2013.01); *F16H 61/47* (2013.01); *B60W 2520/10* (2013.01); *B60W 2540/10* (2013.01); *B60W 2710/06* (2013.01); *B60W 2720/10* (2013.01)

(58) Field of Classification Search
  USPC .......................................................... 701/50
  See application file for complete search history.

(56) References Cited

U.S. PATENT DOCUMENTS

2007/0204605 A1  9/2007 Itoga et al.
2015/0006010 A1* 1/2015 Ito .................. E02F 9/2075
                    701/22

FOREIGN PATENT DOCUMENTS

| | | |
|---|---|---|
| JP | 64-040757 A | 2/1989 |
| JP | 04-203674 A | 7/1992 |
| JP | 2005-280392 A | 10/2005 |
| JP | 2012-057664 A | 3/2012 |
| WO | WO-2013/032395 A1 | 3/2013 |

\* cited by examiner

| Vcp | Vcp1 | Vcp2 | Vcp3 | Vcp4 | Vcp5 | Vcp6 | Vcp7 | Vcp8 |
|-----|------|------|------|------|------|------|------|------|
| Kp  | 0    | Kp1  | Kp2  | Kp3  | Kp4  | 0    | 0    | 0    |
| Ki  | 0    | Ki1  | Ki2  | Ki3  | Ki4  | Ki5  | 0    | 0    |

FIG.7

| Vcp | Vcp1 | Vcp2 | Vcp3 | Vcp4 | Vcp5 |
|-----|------|------|------|------|------|
| Asm | 0 | Asm1 | Asm2 | Asm3 | 0 |

31G

FORKLIFT AND CONTROL METHOD OF FORKLIFT

FIELD

The present invention relates to a forklift having a variable displacement hydraulic pump driven by an engine, and a hydraulic motor which forms a closed circuit with the hydraulic pump therebetween and is driven by hydraulic oil discharged from the hydraulic pump.

BACKGROUND

There are forklifts having a hydraulic driving device referred to as a hydro static transmission (HST) provided between an engine as a driving source and driving wheels. The hydraulic driving device includes a variable displacement traveling hydraulic pump driven by the engine, and a variable displacement hydraulic motor driven by hydraulic oil discharged from the traveling hydraulic pump in a main hydraulic circuit as a closed circuit, and allows a vehicle to travel by transmitting driving of the hydraulic motor to the driving wheels.

CITATION LIST

Patent Literature

Patent Literature 1: Japanese Patent Application Laid-open No. 2012-57664

SUMMARY

Technical Problem

As work peculiar to a forklift, work of unloading a cargo loaded on a working machine onto a ground, a rack or the like is frequently performed. An operator is required to perform positioning operation at an unloading point at a low speed (for example, approximately 0.1 km/h) in order to perform unloading in a space determined in each case. However, a forklift equipped with an HST is hard to produce a low speed required for work from a stopped state by operation of an accelerator pedal.

An object of the invention is to easily achieve low-speed traveling by operation of the accelerator pedal in the forklift equipped with the HST.

Solution to Problem

According to the present invention, a forklift including a variable displacement traveling hydraulic pump driven by an engine, a hydraulic motor that forms a closed circuit with the traveling hydraulic pump therebetween and is driven by hydraulic oil discharged from the traveling hydraulic pump, and driving wheels driven by the hydraulic motor, the forklift comprises: an engine speed sensor configured to detect a rotational speed or an engine speed of the engine; a vehicle speed sensor configured to detect a vehicle speed of the forklift; an accelerator operation unit configured to perform operation for increasing or decreasing an amount of fuel supplied to the engine; an accelerator opening sensor configured to detect an accelerator opening that is an operation amount of the accelerator operation unit; and a control device configured to calculate a target absorption torque or a target swash plate tilting angle of the traveling hydraulic pump based on the accelerator opening detected by the accelerator opening sensor to control the traveling hydraulic pump, wherein the control device includes a target vehicle speed conversion unit configured to convert a first accelerator opening detected by the accelerator opening sensor into a target vehicle speed, an accelerator opening target value setting unit configured to calculate a second accelerator opening by feedback control so that a deviation between the target vehicle speed and an actual vehicle speed detected by the vehicle speed sensor becomes zero, an addition unit configured to add the first accelerator opening and the second accelerator opening to obtain a third accelerator opening, a first maximum absorption torque calculation unit configured to calculate a first maximum absorption torque of the traveling hydraulic pump or a first target tilting angle of a swash plate included in the traveling hydraulic pump based on the third accelerator opening, a second maximum absorption torque calculation unit configured to calculate a second maximum absorption torque of the traveling hydraulic pump or a second target tilting angle of the swash plate based on the rotational speed of the engine obtained from information detected by the engine speed sensor, a target value setting unit configured to output a smaller one of the first maximum absorption torque and the second maximum absorption torque, and an output control unit configured to control the traveling hydraulic pump based on the output from the target value setting unit.

In the present invention, it is preferable that the accelerator opening target value setting unit calculates the second accelerator opening in a range in which the target vehicle speed is a first value or more and a second value or less.

In the present invention, it is preferable that the accelerator opening target value setting unit performs PI control, and as the target vehicle speed increases, the accelerator opening target value setting unit reduces a proportional gain and an integral gain in the PI control.

In the present invention, it is preferable that the accelerator opening target value setting unit sets the integral gain to zero, after the target vehicle speed increases and the proportional gain becomes zero.

According to the present invention, a method of controlling a forklift including a variable displacement traveling hydraulic pump driven by an engine, a hydraulic motor that forms a closed circuit with the traveling hydraulic pump therebetween and is driven by hydraulic oil discharged from the traveling hydraulic pump, driving wheels driven by the hydraulic motor, and an accelerator operation unit configured to perform operation for increasing or decreasing an amount of fuel supplied to the engine, the method comprises: converting a first accelerator opening of the accelerator operation unit into a target vehicle speed; calculating a second accelerator opening by using feedback control so that a deviation between the target vehicle speed and an actual vehicle speed of the forklift becomes zero; obtaining a third accelerator opening by adding the first accelerator opening and the second accelerator opening; calculating a first maximum absorption torque of the traveling hydraulic pump or a first target tilting angle of a swash plate included in the traveling hydraulic pump based on the third accelerator opening; calculating a second maximum absorption torque of the traveling hydraulic pump or a second target tilting angle of the swash plate based on a rotational speed of the engine; and controlling the traveling hydraulic pump based on a smaller one of the first maximum absorption torque and the second maximum absorption torque.

In the present invention, it is preferable that the feedback control is performed in a range in which the target vehicle speed is a first value or more and a second value or less.

In the present invention, it is preferable that PI control is executed in the feedback control, and as the target vehicle speed increases, a proportional gain and an integral gain in the PT control are reduced.

In the present invention, it is preferable that after the target vehicle speed increases and the proportional gain becomes zero, the integral gain is set to zero.

The invention is able to easily achieve low-speed traveling by operation of the accelerator pedal in the forklift equipped with the HST.

BRIEF DESCRIPTION OF DRAWINGS

FIG. 7 is a diagram illustrating an output adjustment unit included in the accelerator opening determination unit according to the modified example.

DESCRIPTION OF EMBODIMENTS

Figure 1:
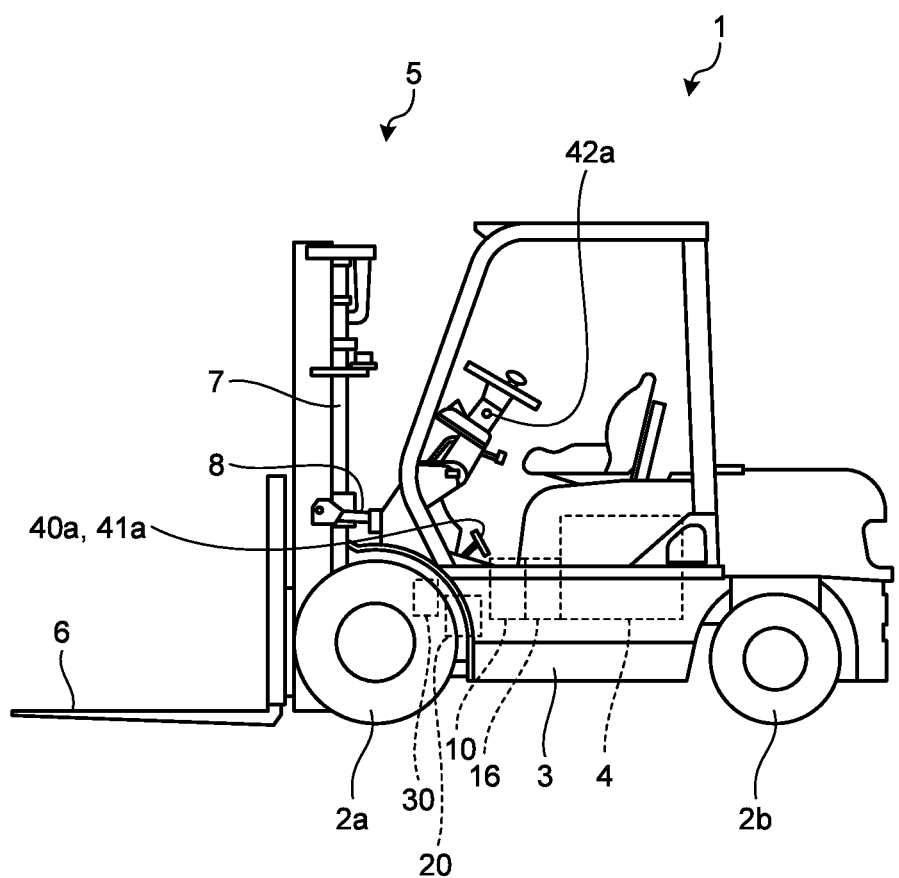
FIG. 1 is a diagram illustrating an overall configuration of a forklift according to an embodiment.

An aspect (embodiment) for carrying out the invention will be described in detail while referring to the drawings.

<Brief Summary of Forklift>

FIG. 1 is a diagram illustrating an overall configuration of a forklift according to an embodiment.

Figure 2:
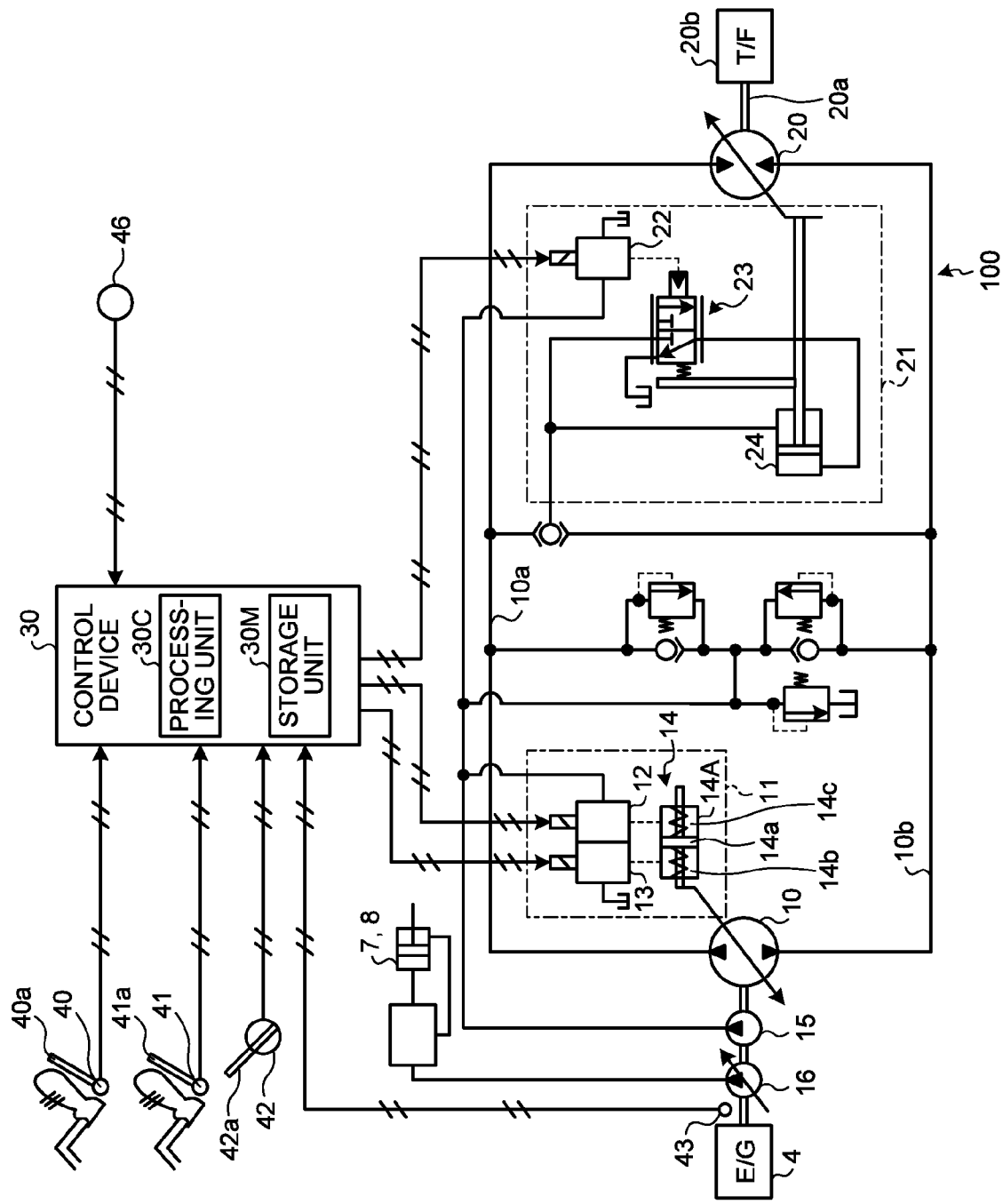
FIG. 2 is a block diagram illustrating a control system of the forklift illustrated in FIG. 1.

FIG. 2 is a block diagram illustrating a control system of the forklift illustrated in FIG. 1. A forklift 1 has a vehicle body 3 having driving wheels 2a and steering wheels 2b, and a working machine 5 provided in front of the vehicle body 3. The vehicle body 3 is provided with an engine 4 as an internal combustion engine, a variable displacement traveling hydraulic pump 10 configured to drive the engine 4 as a driving source, and a working machine hydraulic pump 16. The driving wheels 2a are driven by power of a hydraulic motor 20, by allowing the variable displacement traveling hydraulic pump 10 and a variable displacement hydraulic motor 20 to communicate with each other by a closed hydraulic circuit. In this way, the forklift 1 travels by the HST.

The working machine 5 has a lift cylinder 7 configured to raise and lower a fork 6, and a tilt cylinder 8 configured to tilt the fork 6. A driver's seat of the vehicle body 3 is provided with a forward-reverse lever 42a, a brake pedal (an inching pedal) 40a, an accelerator pedal 41a, and a working machine operation lever (not illustrated) including a lift lever and a tilt lever for operating the working machine 5. The brake pedal 40a and the accelerator pedal 41a are provided at a position where an operator of the forklift 1 is capable of performing a stepping operation from the driver's seat. In FIG. 1, the inching pedal 40a and the accelerator pedal 41a are drawn in an overlapped state. The accelerator pedal 41a is an accelerator operation unit that performs operation for increasing or decreasing an amount of fuel supplied to the engine 4.

<Hydraulic Circuit>

As illustrated in FIG. 2, the forklift 1 includes the traveling hydraulic pump 10 and the hydraulic motor 20 connected by hydraulic supply lines 10a and 10b of a main hydraulic circuit 100 serving as a closed circuit. The traveling hydraulic pump 10 (hereinafter, appropriately referred to as an HST pump 10) is a device that is driven by the engine 4 to discharge the hydraulic oil. In this embodiment, the HST pump 10 is, for example, a variable displacement pump capable of changing the capacity by changing the swash plate tilting angle.

The hydraulic motor 20 (hereinafter, appropriately referred to as HST motor 20) is driven by the hydraulic oil discharged from the HST pump 10. The HST motor 20 is, for example, a variable displacement hydraulic motor capable of changing the capacity by changing the swash plate tilting angle. The HST motor 20 may also be a fixed displacement hydraulic motor. An output shaft 20a of the HST motor 20 is connected to the driving wheels 2a via a transfer 20b, and the HST motor 20 can drive the forklift 1 by rotationally driving the driving wheels 2a.

The HST motor 20 is capable of switching a rotation direction depending on a supply direction of the hydraulic oil from the HST pump 10. The rotation direction of the HST motor 20 is switched, which can move the forklift 1 forward or backward. In the following description, for convenience, it is assumed that when the hydraulic oil is supplied to the HST motor 20 from the hydraulic supply line 10a, the forklift 1 moves forward, and when the hydraulic oil is supplied to the HST motor 20 from the hydraulic supply line 10b, the forklift 1 moves backward.

The forklift 1 has a pump capacity setting unit 11, a motor capacity setting unit 21, and a charge pump 15. The pump capacity setting unit 11 is provided in the HST pump 10. The pump capacity setting unit 11 includes a forward pump electromagnetic proportional control valve 12, a reverse pump electromagnetic proportional control valve 13, and a pump capacity control cylinder 14. In the pump capacity setting unit 11, a command signal is applied to the forward pump electromagnetic proportional control valve 12 and the reverse pump electromagnetic proportional control valve 13 from a control device 30 which will be described below. In the pump capacity setting unit 11, the pump capacity control cylinder 14 is operated according to the command signal applied from the control device 30, the swash plate tilting angle of the HST pump 10 changes, and thus, the capacity thereof changes.

The pump capacity control cylinder 14 is configured so that a swash plate tilting angle of the HST pump 10 becomes zero in a state in which a piston 14a is held in a neutral state. For this reason, even if the engine 4 rotates, an amount of hydraulic oil discharged to the main hydraulic circuit 100 from the HST pump 10 is zero.

From the state in which the swash plate tilting angle of the HST pump 10 is 0, for example, when a command signal for increasing the capacity of the HST pump 10 is applied to the forward pump electromagnetic proportional control valve 12 from the control device 30, the pump control pressure is supplied to the pump capacity control cylinder 14 from the forward pump electromagnetic proportional control valve 12 according to the command signal. As a result, the piston 14a moves to the left side in FIG. 2. When the piston 14a of the pump capacity control cylinder 14 moves to the left side in FIG. 2, the swash plate of the HST pump 10 is tilted toward a direction of discharging the hydraulic oil to the hydraulic supply line 10a in conjunction with this operation.

As the pump control pressure from the forward pump electromagnetic proportional control valve 12 increases, the amount of movement of the piston 14a increases. For this reason, an amount of change in the tilting angle of the swash plate in the HST pump 10 also increases. That is, when the command signal is applied to the forward pump electromagnetic proportional control valve 12 from the control device 30, the pump control pressure depending on the command signal is supplied to the pump capacity control cylinder 14 from the forward pump electromagnetic proportional control valve 12. The pump capacity control cylinder 14 is operated by above-described pump control pressure, and thus the swash plate of the HST pump 10 is tilted so as to be able to discharge a predetermined amount of hydraulic oil to the hydraulic supply line 10a. As a result, if the engine 4 turns, the hydraulic oil is discharged to the hydraulic supply line 10a from the HST pump 10, and the HST motor 20 rotates in the forward direction.

In the above-described state, when a command signal for reducing the capacity of the HST pump 10 is applied to the forward pump electromagnetic proportional control valve 12 from the control device 30, the pump control pressure supplied to the pump capacity control cylinder 14 from the forward pump electromagnetic proportional control valve 12 depending on the command signal decreases. For this reason, the piston 14a of the pump capacity control cylinder 14 moves toward the neutral position. As a result, the swash plate tilting angle of the HST pump 10 decreases, and an amount of discharge of the hydraulic oil to the hydraulic supply line 10a from the HST pump 10 decreases.

When the control device 30 applies the command signal for increasing the capacity of the HST pump 10 to the reverse pump electromagnetic proportional control valve 13, the pump control pressure is supplied to the pump capacity control cylinder 14 from the reverse pump electromagnetic proportional control valve 13 depending on the command signal. Then, the piston 14a moves to the right side in FIG. 2. When the piston 14a of the pump capacity control cylinder 14 moves to the right side in FIG. 2, the swash plate of the HST pump 10 is tilted toward a direction of discharging the hydraulic oil to the hydraulic supply line 10b in conjunction with this operation.

As the pump control pressure supplied from the reverse pump electromagnetic proportional control valve 13 increases, an amount of movement of the piston 14a increases, and thus, an amount of change in the swash plate tilting angle of the HST pump 10 increases. That is, when the command signal is applied to the reverse pump electromagnetic proportional control valve 13 from the control device 30, the pump control pressure depending on the command signal is applied to the pump capacity control cylinder 14 from the reverse pump electromagnetic proportional control valve 13. Moreover, the swash plate of the HST pump 10 is tilted so as to be able to discharge a desired amount of hydraulic oil to the hydraulic supply line 10b by the operation of the pump capacity control cylinder 14. As a result, when the engine 4 turns, the hydraulic oil is discharged to the hydraulic supply line 10b from the HST pump 10, and the HST motor 20 rotates in the reverse direction.

When the command signal for reducing the capacity of the HST pump 10 is applied to the reverse pump electromagnetic proportional control valve 13 from the control device 30, the pump control pressure supplied to the pump capacity control cylinder 14 from the reverse pump electromagnetic proportional control valve 13 depending on the command signal decreases, and the piston 14a moves toward the neutral position. As a result, since the swash plate tilting angle of the HST pump 10 decreases, an amount of hydraulic oil discharged to the hydraulic supply line 10b from the HST pump 10 decreases.

The motor capacity setting unit 21 is provided in the HST motor 20. The motor capacity setting unit 21 includes a motor electromagnetic proportional control valve 22, a motor cylinder control valve 23, and a motor capacity control cylinder 24. In the motor capacity setting unit 21, when the command signal is applied to the motor electromagnetic proportional control valve 22 from the control device 30, the motor control pressure is supplied to the motor cylinder control valve 23 from the motor electromagnetic proportional control valve 22, and the motor capacity control cylinder 24 is operated. When the motor capacity control cylinder 24 is operated, the swash plate tilting angle of the HST motor 20 changes in conjunction with this operation. For this reason, the capacity of the HST motor 20 changes depending on a command signal from the control device 30. More specifically, the motor capacity setting unit 21 is configured so that as a motor control pressure supplied from the motor electromagnetic proportional control valve 22 increases, the swash plate tilting angle of the HST motor 20 decreases.

The charge pump 15 is driven by the engine 4. The charge pump 15 supplies the pump control pressure to the pump capacity control cylinder 14 via the forward pump electromagnetic proportional control valve 12 and the reverse pump electromagnetic proportional control valve 13 described above. Furthermore, the charge pump 15 has a function of supplying the motor control pressure to the motor cylinder control valve 23 via the motor electromagnetic proportional control valve 22.

In this embodiment, the engine 4 drives the working machine hydraulic pump 16 in addition to the HST pump 10. The working machine hydraulic pump 16 supplies the hydraulic oil to the lift cylinder 7 and the tilt cylinder 8 serving as working actuators for driving the working machine 5.

The forklift 1 includes a brake potentiometer 40, an accelerator potentiometer 41, a forward-reverse lever switch 42, a speed sensor 43, and a vehicle speed sensor 46.

When the brake pedal (the inching pedal) 40a is operated, the brake potentiometer 40 detects and outputs an operation amount thereof. The operation amount of the brake pedal 40a is a brake opening Bs. The brake opening Bs output from the brake potentiometer 40 is input to the control device 30.

The accelerator potentiometer 41 outputs the operation amount As when the accelerator pedal 41a is operated. The operation amount As of the accelerator pedal 41a is also referred to as an accelerator opening As. The accelerator opening As output from the accelerator potentiometer 41 is input to the control device 30. Since the accelerator potentiometer 41 detects the accelerator opening As, it also functions as an accelerator opening sensor. Opening the accelerator is to increase the fuel supply amount to the engine 4 by stepping on the accelerator pedal 41a. Closing the accelerator is to reduce the fuel supply amount to the engine 4 by restoring the stepped accelerator pedal 41a.

The forward-reverse lever switch 42 is a selection switch for inputting a traveling direction of the forklift 1. In this embodiment, the forward-reverse lever switch 42 is applied which is capable of selecting three traveling directions of a forward mode, a neutral mode and a reverse mode by operation of the forward-reverse lever 42a provided at a position that can be selectively operated from the driver's seat. Information indicating the traveling direction selected by the forward-reverse lever switch 42 is given to the control device 30 as selection information.

The engine speed sensor 43 detects an actual engine speed (appropriately, referred to as an actual engine speed) Nr of the engine 4 or an actual rotational speed (appropriately, referred to as an actual rotational speed) Nv of the engine 4. The actual rotational speed Nv is an actual rotational speed Nr of the engine 4 per unit time. The actual engine speed Nr and the actual rotational speed Nv are referred to as information about the engine speed of the engine 4. The information about the engine speed of the engine 4 detected by the engine speed sensor 43 is input to the control device 30.

The control device 30 includes a processing unit 30C and a storage unit 30M. For example, the control device 30 is a computer. The processing unit 30C is configured by, for example, a combination of a central processing unit (CPU) and a memory. The processing unit 30C controls the operation of the main hydraulic circuit 100, by reading a computer program for controlling the main hydraulic circuit 100 stored in the storage unit 30M and executing the commands written therein. The storage unit 30M stores the data or the like required for the control of the above-described computer program and the main hydraulic circuit 100. The storage unit 30M is constituted by, for example, read only memory (ROM), a storage device or a combination thereof.

Various sensors such as the brake potentiometer 40, the accelerator potentiometer 41, the forward-reverse lever switch 42, the speed sensor 43, and the vehicle speed sensor 46 are electrically connected to the control device 30. Based on input signals from these various sensors, the control device 30 generates the command signals of the forward pump electromagnetic proportional control valve 12 and the reverse pump electromagnetic proportional control valve 13, and applies the generated command signals to the respective electromagnetic proportional control valves 12, 13, and 22. The control device 30 seeks a target absorption torque of the HST pump 10, based on an accelerator opening As detected by the accelerator potentiometer 41. Moreover, the control device 30 controls the HST pump 10 so that the absorption torque of the HST pump 10 becomes the obtained target absorption torque. In the control of the HST pump 10, the control device 30 changes, for example, the tilting angle of the swash plate of the HST pump 10 by the pump capacity control cylinder 14.

<Characteristics of HST Pump 10>

Figure 3:
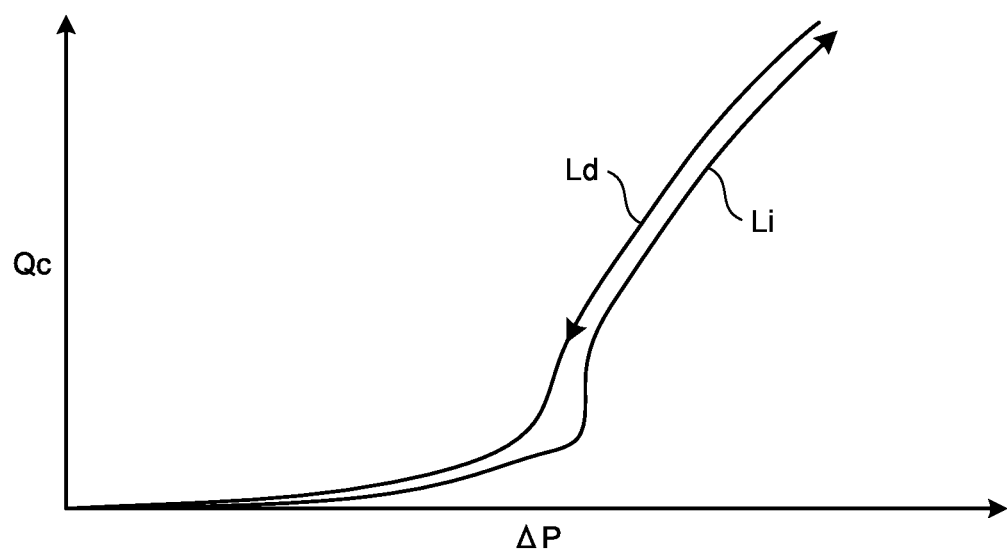
FIG. 3 is a diagram illustrating a relation between a differential pressure of a pump capacity control cylinder and a pump capacity of an HST pump.

FIG. 3 is a diagram illustrating a relation between a differential pressure $\Delta P$ of the pump capacity control cylinder 14 and a pump capacity Qc of the HST pump 10. The differential pressure $\Delta P$ is a difference between a pressure of hydraulic oil supplied to a first hydraulic oil chamber 14$b$ and a pressure of hydraulic oil supplied to a second hydraulic oil chamber 14$c$ of the pump capacity control cylinder 14 illustrated in FIG. 2. The first hydraulic oil chamber 14$b$ is one of two spaces surrounded by a cylinder case 14A and the piston 14$a$, and the second hydraulic oil chamber 14$c$ is the other of the above-described two spaces. A characteristics line Li of FIG. 3 represents a change in the pump capacity Qc when the differential pressure $\Delta P$ increases, and a characteristic line Ld represents a change in the pump capacity Qc when the differential pressure $\Delta P$ decreases.

In general, when a targeted pump capacity Qc is very small, in a case where the HST pump 10 generates the targeted pump capacity Qc from when the pump capacity Qc is zero, as represented by a characteristic line Li in FIG. 3, power to move the swash plate of the HST pump 10 by sliding resistance or the like of static friction increases. When the swash plate of the HST pump 10 begins to move once, since the sliding resistance becomes smaller, the swash plate tilts greatly more than the targeted tilting angle, and the pump capacity Qc exceeds the target value. Moreover, since the traveling resistance decreases after the forklift 1 begins to move from a stopped state, the pump capacity increases in the characteristics of the pressure and the pump capacity of the HST pump 10, and thus, the forklift 1 suddenly starts. Therefore, in many cases, the forklift 1 equipped with the HST generally has difficulty in generating a low vehicle speed to perform fine positioning operation in that state. It is possible to drop the lowest vehicle speed by increasing the capacity of the HST motor 20 or by increasing a speed reduction ratio of a drive axle, but this is often difficult in terms of a layout of the forklift.

In a case where the operator performs positioning operation of the cargo, when trying to quickly start the forklift 1 equipped with the HST from a stopped state at a low speed, a dead stroke is generated in the accelerator pedal 41$a$. The dead stroke refers to a region where the forklift does not begin to start even if the driver steps on the accelerator pedal 41$a$ during stroke of the accelerator pedal 41$a$. The HST motor 20 illustrated in FIG. 2 generates a torque, but a presence of a state in which torque enough to move the forklift 1 does not occur is a cause of the dead stroke. In particular, when the temperature (hereinafter, appropriately referred to as a hydraulic oil temperature) of the hydraulic oil rises, since leakage of the pressure of the hydraulic oil occurs in the HST motor 20 or the like, the dead stroke increases.

Since an amount of the dead stroke changes by status of the forklift 1, for example, the temperature of the hydraulic oil or the like, the operator needs to explore the start of movement of the vehicle relative to the stepping amount of the accelerator pedal 41$a$. For this reason, the forklift 1 equipped with the HST is hard to perform the rapid positioning operation, which becomes a burden on the operator.

There is control that increases the stroke of the accelerator pedal 41$a$, that is, the torque of the HST motor 20 illustrated in FIG. 2 in accordance with the accelerator opening As with respect to the forklift 1 equipped with the HST, that is, increases the absorption torque of the HST pump 10. With such control, when the traveling load changes depending on loading of the cargo, a state of the road surface or the like, the torque when the forklift 1 starts also changes. For this reason, a dead stroke amount of the accelerator pedal 41$a$ also changes.

It is conceivable to set a state in which the accelerator opening As is small in accordance with the condition of the largest dead stroke, for example, so that the forklift 1 starts at 1%, in consideration of an increase or decrease in the dead stroke amount of the accelerator pedal 41$a$ due to a change in the status. In this way, it is possible to appropriately start the forklift 1 with respect to stepping of the accelerator pedal 41$a$ in the condition of the largest dead stroke, but in the case of changing to the condition of the small dead stroke, there is a possibility that the forklift 1 may vigorously jump out when beginning to step on the accelerator pedal 41$a$.

Thus, the forklift 1 equipped with the HST is hard to generate a vehicle speed of the low speed (for example, approximately 0.1 km/h) required for the loading and unloading work from the stopped state by operation of the accelerator pedal 41$a$ by the operator. Furthermore, due to the dead stroke of the accelerator pedal 41$a$, the forklift 1 equipped with the HST is hard to perform the fine positioning operation at a low speed. For this reason, the forklift 1 equipped with the HST is hard to perform the fine positioning operation of the cargo required for performing the positioning operation at a low speed.

Regarding the problem in which the forklift 1 equipped with the HST is hard to perform the operation during traveling at a low speed, in this embodiment, the control device 30 feeds back the actual vehicle speed Vc of the forklift 1 up to a predetermined accelerator opening As to determine the accelerator opening As. In this way, the control device 30 is able to reduce the lowest actual vehicle speed Vc capable of being maintained when the forklift 1 begins to move. Furthermore, even if load of the forklift 1 and the hydraulic oil temperature changes, by feeding back the actual vehicle speed Vc to determine the accelerator opening As, the control device 30 can reduce the dead stroke of the accelerator pedal 41a. Accordingly, it is possible to improve responsiveness of the forklift 1 with respect to the operation of the accelerator pedal 41a. Furthermore, when determining the accelerator opening As by feeding back the actual vehicle speed Vc, the control device 30 changes parameters (gain) of the feedback control depending on the accelerator opening As. In this way, it is possible to achieve the control of the actual vehicle speed Vc proportional to the accelerator opening As only when the actual vehicle speed Vc of the forklift 1 is in a very low speed range, and it is possible to reduce the discomfort of the operator by releasing this control in ranges other than a very slow speed range. Next, the control device 30 configured to execute the above-described control will be described in more detail.

<Control Device 30>

Figure 4:
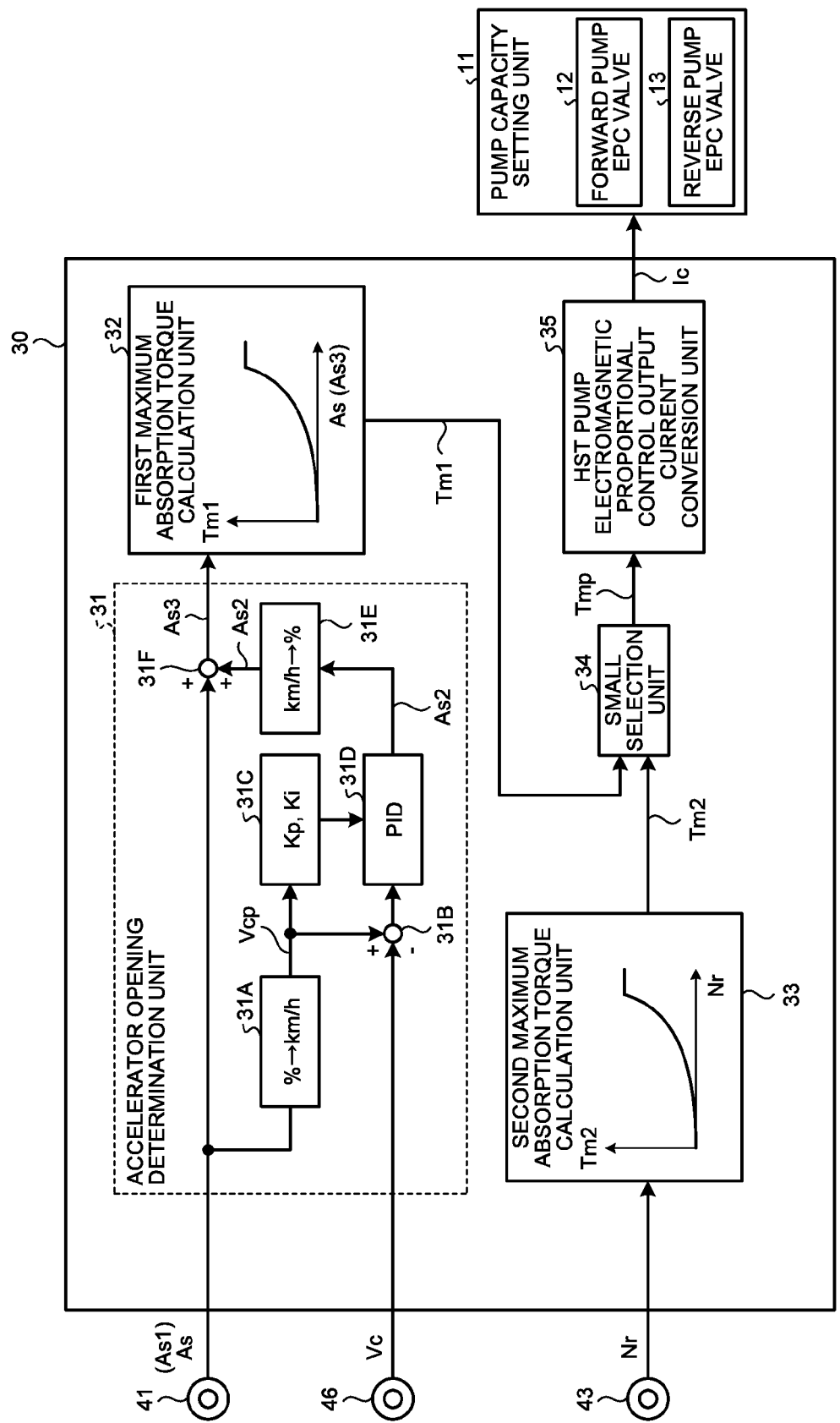
FIG. 4 is a block diagram illustrating a control example of the HST pump of this embodiment executed by a control device.

FIG. 4 is a block diagram illustrating a control example of the HST pump 10 of this embodiment executed by the control device 30. As illustrated in FIG. 4, the control device 30 includes an accelerator opening determination unit 31, a first maximum absorption torque calculation unit 32, a second maximum absorption torque calculation unit 33, a small selection unit 34 as a target value setting unit, and an HST pump electromagnetic proportional control output current conversion unit 35 as an output control unit.

The accelerator opening determination unit 31 includes a target vehicle speed conversion unit 31A, a subtraction unit 31B, a gain setting unit 31C, an accelerator opening target value setting unit 31D, a target accelerator opening conversion unit 31E, and an addition unit 31F. An accelerator opening As (a first accelerator opening As1) detected by the accelerator potentiometer 41 and an actual vehicle speed Vc of the forklift 1 detected by the vehicle speed sensor 46 are input to the accelerator opening determination unit 31.

The first accelerator opening As1 is input to the target vehicle speed conversion unit 31A of the accelerator opening determination unit 31 and the addition unit 31F. The actual vehicle speed Vc is input to the subtraction unit 31B. The target vehicle speed conversion unit 31A converts the first accelerator opening As1 [%] detected by the accelerator potentiometer 41 into a target vehicle speed Vcp [km/h]. For example, the first accelerator opening As1 and the target vehicle speed Vcp corresponding thereto are set in advance to create a map, and the map is stored in the storage unit 30M of the control device 30 illustrated in FIG. 2. The target vehicle speed conversion unit 31A obtains the corresponding target vehicle speed Vcp by the above-described map after obtaining the first accelerator opening As1, and outputs the target vehicle speed Vcp to the subtraction unit 31B and the gain setting unit 31C.

The subtraction unit 31B seeks a deviation between the target vehicle speed Vcp from the target vehicle speed conversion unit 31A and the actual vehicle speed Vc of the forklift 1 detected by the vehicle speed sensor 46, and outputs the deviation to the accelerator opening target value setting unit 31D. The gain setting unit 31C changes a gain of the feedback control executed by the accelerator opening target value setting unit 31D, specifically, at least one of a proportional gain Kp and an integral gain Ki, based on the target vehicle speed Vcp from the target vehicle speed conversion unit 31A.

The accelerator opening target value setting unit 31D seeks a second accelerator opening As2 by the feedback control so that the output from the subtraction unit 31B becomes zero. The output from the subtraction unit 31B is a deviation between the target vehicle speed Vcp from the target vehicle speed conversion unit 31A and the actual vehicle speed Vc detected by the vehicle speed sensor 46. In this embodiment, the accelerator opening target value setting unit 31D seeks the second accelerator opening As2 by performing PI control, that is, proportional control and integral control, but is not limited thereto. For example, the accelerator opening target value setting unit 31D may also seek a second accelerator opening As2 by performing D control, that is, differential control, in addition to the PI control. The second accelerator opening As2 sought by the accelerator opening target value setting unit 31D is a speed corresponding to the accelerator opening. The target accelerator opening conversion unit 31E converts the second accelerator opening As2 as a speed sought by the accelerator opening target value setting unit 31D into a second accelerator opening speed As2 as a ratio or a rate.

The addition unit 31F adds the first accelerator opening As1 output from the accelerator potentiometer 41 and the second accelerator opening As2 output from the target accelerator opening conversion unit 31E to seek a third accelerator opening As3. The addition unit 31F outputs the sought third accelerator opening As3 to the first maximum absorption torque calculation unit 32.

The first maximum absorption torque calculation unit 32 seeks a first maximum absorption torque Tm1 of the HST pump 10 from the third accelerator opening As3 that is output from the addition unit 31F. The first maximum absorption torque Tm1 is determined, for example, so that a fuel consumption rate of the engine 4 illustrated in FIG. 2 is minimized, but not limited thereto.

As a second maximum absorption torque Tm2, the second maximum absorption torque Tm2 of the HST pump 10 is sought from the rotational speed of the engine 4 obtained from information detected by the engine speed sensor 43. Similar to the first maximum absorption torque Tm1, the second maximum absorption torque Tm2 is also determined, for example, so that the fuel consumption rate of the engine 4 illustrated in FIG. 2 is minimized, but not limited thereto.

The small selection unit 34 sets the smaller torque between the first maximum absorption torque Tm1 and the second maximum absorption torque Tm2 as a target absorption torque Tmp of the HST pump 10, and outputs the smaller torque to the HST pump electromagnetic proportional control output current conversion unit 35.

The HST pump electromagnetic proportional control output current conversion unit 35 as an output control unit generates a target absorption torque command Ic based on the output from the small selection unit 34, that is, the target absorption torque Tmp, and outputs the generated command to the pump capacity setting unit 11 of the HST pump 10. In response to the target absorption torque command Ic, the pump capacity setting unit 11 controls the swash plate tilting angle of the HST pump 10 so that the torque absorbed by the HST pump 10 becomes the target absorption torque Tmp.

The target absorption torque Tmp is an example of parameters used in controlling the HST pump 10. The HST pump electromagnetic proportional control output current conversion unit 35 may control the HST pump 10 using a targeted tilting angle (target swash plate tilting angle) of the swash plate of the HST pump 10, in place of the target absorption torque Tmp. In this case, a first tilting angle calculation unit configured to seek a first target swash plate tilting angle of the HST pump 10 from the accelerator opening As may be used in place of the first maximum absorption torque calculation unit 32. Furthermore, a second tilting angle calculation unit configured to seek the second target swash plate tilting angle of the HST pump 10 from the accelerator opening As may be used in place of the second maximum absorption torque calculation unit 33.

The target absorption torque command Ic is a signal (a current value in this embodiment) for converting the torque absorbed by the HST pump 10 into a target absorption torque Tmp or converting the tilting angle into a target swash plate tilting angle. The target absorption torque command Ic is output to the forward pump electromagnetic proportional control valve 12 or the reverse pump electromagnetic proportional control valve 13 of the pump capacity setting unit 11 from the HST pump electromagnetic proportional control output current conversion unit 35.

Figures 5, 6:
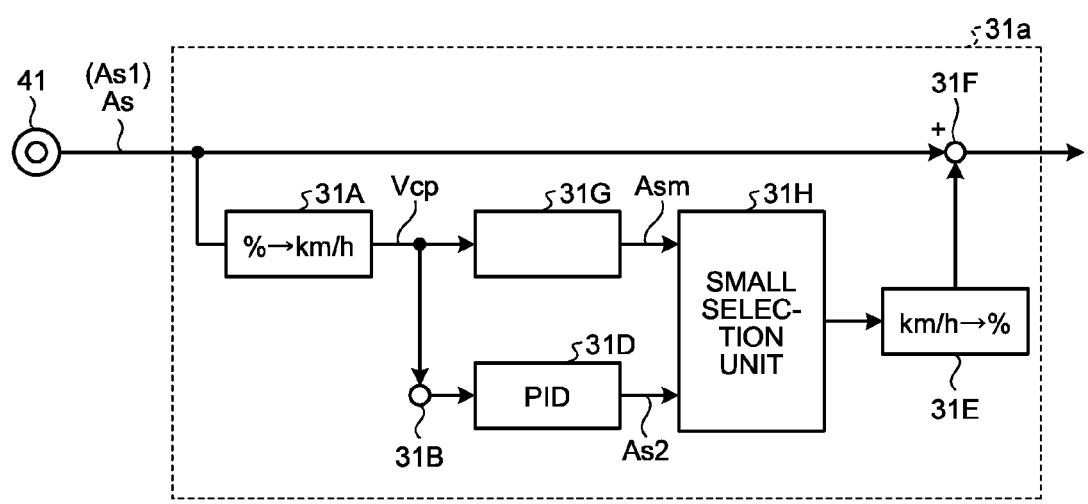
FIG. 5 is a conceptual diagram illustrating a gain setting unit.
FIG. 6 is a block diagram illustrating an accelerator opening determination unit according to a modified example of this embodiment.

FIG. 5 is a conceptual diagram illustrating the gain setting unit 31C. In this embodiment, the gain setting unit 31C has a map in which a proportional gain Kp and an integral gain Ki of the feedback control are set depending on the target vehicle speed Vcp. When the target vehicle speed Vcp is input, the gain setting unit 31C outputs the corresponding proportional gain Kp and integral gain Ki to the accelerator opening target value setting unit 31D.

The greater the numbers to be added to the target vehicle speed Vcp are, the greater the target vehicle speed Vcp is. The greater the numbers to be added to the proportional gain Kp and the integral gain Ki are, the smaller the values thereof are. In this way, it is possible to reduce a degree of intervention of the feedback control using the actual vehicle speed Vc of the accelerator opening determination unit 31, depending on an increase in the target vehicle speed Vcp, that is, the accelerator opening As detected by the accelerator potentiometer 41. Moreover, when the accelerator opening As exceeds a certain size, there is no intervention of the feedback control of the accelerator opening determination unit 31, and the control device 30 controls the HST pump by the control of determining the maximum absorption torque of the HST pump 10 depending on the actual rotational speed Nv of the engine 4. As a result, it is possible to reduce the discomfort of operability that the operator of the forklift 1 receives.

In this embodiment, the proportional gain Kp and the integral gain Ki are set to values greater than zero in a predetermined range in which the target vehicle speed Vcp is a first value or more and a second value or less, and become zero outside a predetermined range. That is, the control device 30 executes feedback control in a predetermined range in which the target vehicle speed Vcp is a first value or more and a second value or less. That is, a second accelerator opening As2 is sought in a predetermined range in which the target vehicle speed Vcp is a first value or more and a second value or less. The proportional gain Kp is set to a value greater than zero in a range in which the target vehicle speed Vcp is from Vcp2 (first value) to Vcp5, and the integral gain Ki is set to a value greater than zero in a range in which the target vehicle speed Vcp is from Vcp2 to Vcp6 (second value). In this way, only when the forklift 1 travels at the target vehicle speed Vcp6 or less, the control device 30 executes the feedback control to achieve the control of the actual vehicle speed Vc proportional to the accelerator opening As.

Even if the operator steps on the accelerator pedal 41a only slightly, the proportional gain Kp and the integral gain Ki become a value exceeding zero. Only when the accelerator opening As is 0%, the proportional gain Kp and the integral gain Ki become zero. The reason is that in the case of closing the accelerator pedal 41a, the control is not required. In FIG. 5, a column of Vcp1 corresponds to the accelerator opening As of 0%. In the column of Vcp1, the values of the proportional gain Kp and the integral gain Ki are zero. In a column of Vcp2, the values of the proportional gain Kp and the integral gain Ki extremely approach zero and become values exceeding zero (for example, the accelerator opening As is equivalent to 1%).

In this embodiment, when the forklift 1 begins to move, the control device 30 controls the actual vehicle speed Vc in proportion to the accelerator opening As. For this reason, if an accelerator opening As (a first accelerator opening As1) corresponding to the target vehicle speed Vcp is obtained, the target vehicle speed Vcp (in this example, a target vehicle speed Vcp6) having the proportional gain Kp set to zero is set to an enough dimension for the forklift 1 to begin moving on the flat land. In this embodiment, for example, at the time of the target vehicle speed Vcp corresponding to the accelerator opening As at which the forklift 1 can travel in a low idle state of the engine 4 illustrated in FIG. 2, the proportional gain Kp is set to be zero. In this way, after the forklift 1 begins to move, intervention of the feedback control using the actual vehicle speed Vc of the accelerator opening determination unit 31 is reliably stopped.

The integral gain Ki becomes zero at the greater target vehicle speed Vcp (in this example, a target vehicle speed Vcp7) in which the proportional gain Kp becomes zero. That is, when the proportional gain Kp becomes zero, the integral gain Ki becomes a value still greater than zero, and when the target vehicle speed Vcp further increases, the integral gain Ki also becomes zero. In this way, as the target vehicle speed Vcp increases, that is, as the accelerator opening As increases, the gain setting unit 31C reduces the proportional gain Kp and the integral gain Ki, and sets the proportional gain Kp and the integral gain Ki to zero in this order. In this embodiment, for example, until the target vehicle speed Vcp corresponding to the accelerator opening As at which the forklift 1 can travel in a low idle state of the engine 4 illustrated in FIG. 2, the integral gain Ki is maintained at a value greater than zero. In this way, for example, even if the hydraulic oil temperature increases and leakage or the like of the pressure of the hydraulic oil occurs in the HST pump 10 or the like, it is possible to reliably start the forklift 1. In addition, it is possible to reduce the possibility of sudden acceleration or deceleration of the forklift 1.

In the feedback control using the actual vehicle speed Vc of the accelerator opening determination unit 31, it is preferable that an upper limit be provided in the integral value. In this way, an occurrence of hunting when the forklift starts at a very low speed is suppressed. Furthermore, the integral gain Ki may change depending on the temperature of the hydraulic oil. For example, as the hydraulic oil temperature rises, the integral gain Ki may increase. When the hydraulic oil temperature rises, leakage of hydraulic oil in the HST pump 10 or the like increases, which results in an increase in the residual deviation, but as described above, it is possible to effectively suppress the residual deviation due to an increase in the temperature of the hydraulic oil.

In this embodiment, when the stroke of the brake pedal (the inching pedal) 40a is a predetermined threshold or more, for example, when the brake pedal 40a is stepped on beyond a play, the feedback control using the actual vehicle speed Vc of the accelerator opening determination unit 31 may be stopped. In this way, when the operator simultaneously operates the accelerator pedal 41a and the brake pedal 40a to finely adjust a position of the forklift 1 at a very slow speed, it is possible to suppress hunting due to accumulation of the integration value.

<Modified Example of Accelerator Opening Determination Unit 31>

FIG. 6 is a block diagram illustrating an accelerator opening determination unit 31a according to a modified example of this embodiment. FIG. 7 is a diagram illustrating an output adjustment unit 31G provided in the accelerator opening determination unit 31a according to this modified example. The accelerator opening determination unit 31a is different from the accelerator opening determination unit 31 illustrated in FIG. 3 that the former includes the output adjustment unit 31G and a small selection unit 31H.

The target vehicle speed Vcp from the target vehicle speed conversion unit 31A is input to the output adjustment unit 31G. In this embodiment, as illustrated in FIG. 7, the target vehicle speed conversion unit 31A is configured so that an output value Asm is set depending on the target vehicle speed Vcp. The output adjustment unit 31G outputs the corresponding output value Asm depending on the target vehicle speed Vcp that is input from the target vehicle speed conversion unit 31A. In this example, the larger the numbers added to the target vehicle speed Vcp are, the greater the target vehicle speed Vcp is. Output values Asm1, Asm2, and Asm3 are set to values exceeding the upper limit of the second accelerator opening As2 that are output from the accelerator opening target value setting unit 31D. The output of the output adjustment unit 31G and the second accelerator opening As2 output from the accelerator opening target value setting unit 31D are input to the small selection unit 31H.

In the output adjustment unit 31G, the output values Asm1, Asm2, and Asm3 are set with respect to the target vehicle speeds Vcp2, Vcp3, and Vcp4, and the output values Asm of the target vehicle speeds Vcp1 and Vcp5 are zero. A range of the target vehicle speeds Vcp2, Vcp3, and Vcp4 is a range which allows the feedback control of the accelerator opening determination unit 31a to intervene.

In the case of the target vehicle speeds Vcp2, Vcp3, and Vcp4, the output values Asm1, Asm2, and Asm3 are output to the small selection unit 31H from the output adjustment unit 31G. Since the output values Asm1, Asm2, and Asm3 are greater than the upper limit of the second accelerator opening As2 that is output from the accelerator opening target value setting unit 31D, when the output values Asm1, Asm2, and Asm3 and the second accelerator opening As2 are input, the small selection unit 31H outputs the second accelerator opening As2 to the target accelerator opening conversion unit 31E. In this way, when starting the forklift 1 at a very slow speed, the accelerator opening determination unit 31a can allow the feedback control of the accelerator opening determination unit 31a to intervene.

As described above, in this embodiment, when starting the forklift 1 to travel at a low speed (for example, approximately 0.1 km/h), the control device 30 feeds back the accelerator opening As so that a deviation between the actual vehicle speed Vc of the forklift 1 and the target vehicle speed Vcp obtained from the accelerator opening As becomes zero. Moreover, the control device 30 controls the HST pump 10, for example, by seeking a target absorption torque Tmp of the HST pump 10 or a targeted tilting angle of the swash plate, based on an accelerator opening As obtained by the above-described feedback control. By such control, since the actual vehicle speed Vc is controlled in proportion to the accelerator opening As in the state of beginning to move from a stopped state (a very slow speed range), the forklift 1 easily maintains the low speed.

Furthermore, even when quickly moving the forklift 1 by a small distance from a stopped state at a slow speed in order for an operator to perform the positioning operation of the cargo, the actual vehicle speed Vc of the forklift 1 is controlled in proportion to the accelerator opening As. For this reason, even if the load applied to the forklift 1 or the hydraulic oil temperature of the HST pump 10 or the like changes, since the dead stroke of the accelerator pedal 41a is suppressed, the operator easily grasps timing when the forklift 1 begins to move. As a result, since the forklift 1 starts from a stopped state and the rapid positioning operation at a low speed becomes easier, it is possible to reduce the burden on the operator.

The embodiment has been described above, but the embodiment is not limited by the foregoing description. Furthermore, the above-described components include components capable of being easily assumed by an ordinary person skilled in the art, components that are substantially the same, and so-called components within the range of equivalents. Furthermore, the above-described components can be appropriately combined. In addition, it is possible to perform at least one of various omissions, substitutions, and modifications without departing from the scope of the embodiment.

REFERENCE SIGNS LIST

1 FORKLIFT
2a DRIVING WHEELS
4 ENGINE
5 WORKING MACHINE
10 TRAVELING HYDRAULIC PUMP (HST PUMP)
11 PUMP CAPACITY SETTING UNIT
12 FORWARD PUMP ELECTROMAGNETIC PROPORTIONAL CONTROL VALVE
13 REVERSE PUMP ELECTROMAGNETIC PROPORTIONAL CONTROL VALVE
14 PUMP CAPACITY CONTROL CYLINDER
20 HYDRAULIC MOTOR (HST MOTOR)
21 MOTOR CAPACITY SETTING UNIT
30 CONTROL DEVICE
31, 31a ACCELERATOR OPENING DETERMINATION UNIT
31A TARGET VEHICLE SPEED CONVERSION UNIT
31B SUBTRACTION UNIT
31C GAIN SETTING UNIT
31D ACCELERATOR OPENING TARGET VALUE SETTING UNIT
31E TARGET ACCELERATOR OPENING CONVERSION UNIT
31F ADDITION UNIT
31G OUTPUT ADJUSTMENT UNIT
31H SMALL SELECTION UNIT
32 FIRST MAXIMUM ABSORPTION TORQUE CALCULATION UNIT
33 SECOND MAXIMUM ABSORPTION TORQUE CALCULATION UNIT
34 SMALL SELECTION UNIT

35 HST PUMP ELECTROMAGNETIC PROPORTIONAL CONTROL OUTPUT CURRENT CONVERSION UNIT
40 BRAKE POTENTIOMETER
40a BRAKE PEDAL
41 ACCELERATOR POTENTIOMETER
41a ACCELERATOR PEDAL
43 ENGINE SPEED SENSOR
46 VEHICLE SPEED SENSOR
100 MAIN HYDRAULIC CIRCUIT
As ACCELERATOR OPENING
Ki INTEGRAL GAIN
Kp PROPORTIONAL GAIN
Tm1 FIRST MAXIMUM ABSORPTION TORQUE
Tm2 SECOND MAXIMUM ABSORPTION TORQUE
Tmp TARGET ABSORPTION TORQUE
Vc ACTUAL VEHICLE SPEED
Vcp TARGET VEHICLE SPEED

The invention claimed is:

1. A forklift including a variable displacement traveling hydraulic pump driven by an engine, a hydraulic motor that forms a closed circuit with the traveling hydraulic pump therebetween and is driven by hydraulic oil discharged from the traveling hydraulic pump, and driving wheels driven by the hydraulic motor, the forklift comprising:
an engine speed sensor configured to detect a rotational speed or an engine speed of the engine;
a vehicle speed sensor configured to detect a vehicle speed of the forklift;
an accelerator operation unit configured to perform operation for increasing or decreasing an amount of fuel supplied to the engine;
an accelerator opening sensor configured to detect an accelerator opening that is an operation amount of the accelerator operation unit; and
a control device configured to calculate a target absorption torque or a target swash plate tilting angle of the traveling hydraulic pump based on the accelerator opening detected by the accelerator opening sensor to control the traveling hydraulic pump,
wherein the control device includes
a target vehicle speed conversion unit configured to convert a first accelerator opening detected by the accelerator opening sensor into a target vehicle speed,
an accelerator opening target value setting unit configured to calculate a second accelerator opening by feedback control so that a deviation between the target vehicle speed and an actual vehicle speed detected by the vehicle speed sensor becomes zero,
an addition unit configured to add the first accelerator opening and the second accelerator opening to obtain a third accelerator opening,
a first maximum absorption torque calculation unit configured to calculate a first maximum absorption torque of the traveling hydraulic pump or a first target tilting angle of a swash plate included in the traveling hydraulic pump based on the third accelerator opening,
a second maximum absorption torque calculation unit configured to calculate a second maximum absorption torque of the traveling hydraulic pump or a second target tilting angle of the swash plate based on the rotational speed of the engine obtained from information detected by the engine speed sensor,
a target value setting unit configured to output a smaller one of the first maximum absorption torque and the second maximum absorption torque, and
an output control unit configured to control the traveling hydraulic pump based on the output from the target value setting unit.

2. The forklift according to claim 1,
wherein the accelerator opening target value setting unit calculates the second accelerator opening in a range in which the target vehicle speed is a first value or more and a second value or less.

3. The forklift according to claim 2,
wherein the accelerator opening target value setting unit performs PI control, and
as the target vehicle speed increases, the accelerator opening target value setting unit reduces a proportional gain and an integral gain in the PI control.

4. The forklift according to claim 3,
wherein the accelerator opening target value setting unit sets the integral gain to zero, after the target vehicle speed increases and the proportional gain becomes zero.

5. A method of controlling a forklift including a variable displacement traveling hydraulic pump driven by an engine, a hydraulic motor that forms a closed circuit with the traveling hydraulic pump therebetween and is driven by hydraulic oil discharged from the traveling hydraulic pump, driving wheels driven by the hydraulic motor, and an accelerator operation unit configured to perform operation for increasing or decreasing an amount of fuel supplied to the engine, the method comprising:
converting a first accelerator opening of the accelerator operation unit into a target vehicle speed;
calculating a second accelerator opening by using feedback control so that a deviation between the target vehicle speed and an actual vehicle speed of the forklift becomes zero;
obtaining a third accelerator opening by adding the first accelerator opening and the second accelerator opening;
calculating a first maximum absorption torque of the traveling hydraulic pump or a first target tilting angle of a swash plate included in the traveling hydraulic pump based on the third accelerator opening;
calculating a second maximum absorption torque of the traveling hydraulic pump or a second target tilting angle of the swash plate based on a rotational speed of the engine; and
controlling the traveling hydraulic pump based on a smaller one of the first maximum absorption torque and the second maximum absorption torque.

6. The method of controlling a forklift according to claim 5,
wherein the feedback control is performed in a range in which the target vehicle speed is a first value or more and a second value or less.

7. The method of controlling a forklift according to claim 6,
wherein PI control is executed in the feedback control, and
as the target vehicle speed increases, a proportional gain and an integral gain in the PI control are reduced.

8. The method of controlling a forklift according to claim 7, wherein after the target vehicle speed increases and the proportional gain becomes zero, the integral gain is set to zero.

* * * * *